(12) United States Patent
Shackle

(10) Patent No.: US 6,420,838 B1
(45) Date of Patent: Jul. 16, 2002

(54) FLUORESCENT LAMP BALLAST WITH INTEGRATED CIRCUIT

(76) Inventor: Peter W. Shackle, Robertson Worldwide, Inc., 13611 Thornton Rd., City Blue Island, IL (US) 60406

( * ) Notice: Subject to any disclaimer, the term of this patent is extended or adjusted under 35 U.S.C. 154(b) by 0 days.

(21) Appl. No.: 09/801,496

(22) Filed: Mar. 8, 2001

(51) Int. Cl.$^7$ ............................................... H05B 37/02
(52) U.S. Cl. .................................. 315/224; 315/209 R
(58) Field of Search ................................ 315/224, 225, 315/226, 291, DIG. 7, 307, 209 R, 200 R, 205, 207, 208, 203, 219; H05B 37/02

(56) References Cited

U.S. PATENT DOCUMENTS

| | | | |
|---|---|---|---|
| 5,747,943 A | | 5/1998 | Houk et al. |
| 5,828,185 A | * | 10/1998 | Fellows et al. ............. 315/246 |
| 5,892,335 A | * | 4/1999 | Archer ........................ 315/247 |
| 5,925,990 A | | 7/1999 | Crouse et al. |
| 5,986,410 A | | 11/1999 | Nerone |
| 6,008,592 A | * | 12/1999 | Ribarich ..................... 315/225 |
| 6,023,132 A | * | 2/2000 | Crouse et al. ............... 315/307 |
| 6,051,933 A | * | 4/2000 | Aiello et al. ............ 315/209 R |
| 6,211,623 B1 | | 4/2001 | Wilhelm et al. |
| 6,262,542 B1 | * | 7/2001 | Kim et al. ................... 315/224 |
| 6,281,639 B1 | * | 8/2001 | Suzuki et al. ............... 315/291 |
| 6,181,079 B1 | * | 1/2002 | Chang et al. ............... 315/247 |

OTHER PUBLICATIONS

Specification & drawings for U.S. patent application Ser. No. 08/494,193, filed Jan. 28, 2000, for 'Fluorescent Lamp Ballast Using Integrated Circuit,' by Joseph M. Allison et al. The overvoltage protection circuit 110 may be relevant, and other aspects may be relevant.

* cited by examiner

Primary Examiner—Don Wong
Assistant Examiner—Trinh Vo Dinh
(74) Attorney, Agent, or Firm—Charles E. Bruzga

(57) ABSTRACT

A ballast for a fluorescent lamp incorporates in an integrated circuit (IC) complex circuit functions, such as driving a switching arrangement that provides AC power to the lamp. Beneficially, such IC's may be widely available and inexpensive. Additional circuitry complements such IC by protecting against one or more of the following three conditions: (1) the lamp starting to significantly rectify current in either direction, (2) the lamp voltage exceeding a predetermined level for a prolonged duration, and (3) the power mains supply voltage falling below a predetermined level.

22 Claims, 5 Drawing Sheets

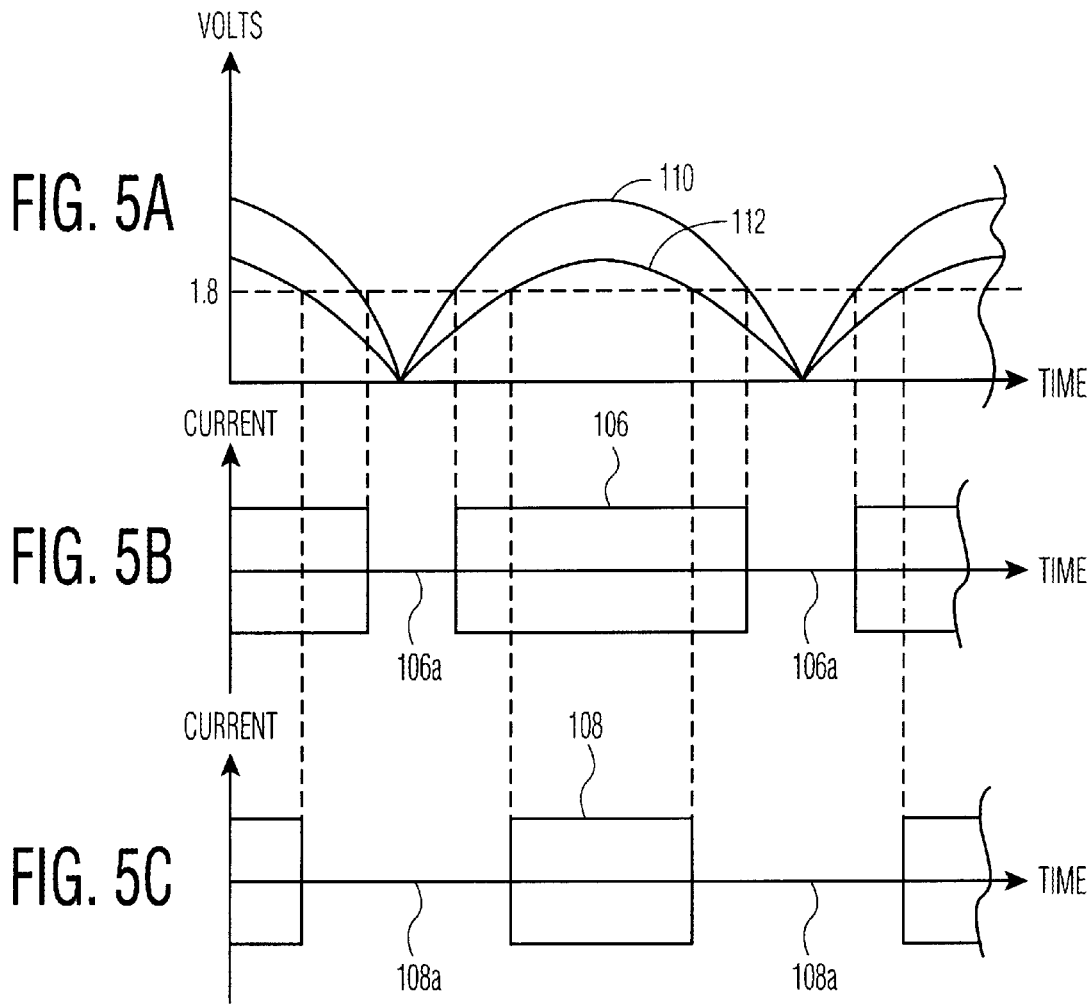

US 6,420,838 B1

FLUORESCENT LAMP BALLAST WITH INTEGRATED CIRCUIT

FIELD OF THE INVENTION

This invention relates to fluorescent lamp ballasts incorporating an integrated circuit. More particularly, the invention relates to such ballasts including additional circuitry for protecting the ballast when one or more of the following three conditions occur: (1) the lamp starting to significantly rectify current in either direction, (2) the lamp voltage exceeding a predetermined level for a significant time such as half a minute, and (3) the power mains supply voltage falling below a predetermined level.

BACKGROUND OF THE INVENTION

Ballasts, or power-supply, circuits for fluorescent lamps can benefit from incorporating complex circuit functions in integrated circuit (IC) form. Widely available, low cost IC's can include various functions, such as driving a switching arrangement that provides AC power for the lamp. It would be desirable to inexpensively complement the widely available IC's, with protection from one or more of the following three conditions: (1) the lamp starting to significantly rectify current in either direction, (2) the lamp voltage exceeding a predetermined level for a prolonged duration, and (3) the power mains supply voltage falling below a predetermined level.

SUMMARY OF THE INVENTION

A preferred embodiment of the invention protects from all of the foregoing three conditions relating to (1) lamp rectification, (2) excessive lamp voltage, and (3) low line voltage comprises the following circuitry. That embodiment comprises a gas discharge lamp ballast in which a resonant load circuit for at least one lamp includes a DC blocking capacitor connected between a reference node and the at least one lamp. A switching arrangement includes first and second switches serially connected between a rail node at a DC potential and the reference node, for supplying AC current to the load via a midpoint node between the first and second switches. This embodiment protects against all three conditions in a ballast having an integrated circuit including (1) a driver for the switching arrangement including control means to create a frequency sweep from a pre-heat frequency, through a substantially lower, resonant frequency, to a still lower operating frequency, (2) a pre-heat pin for triggering the control means to re-start a frequency sweep in response to a re-start signal that exceeds a threshold level, (3) a shut-down pin associated with an internal shut-down latch for shutting down the driver in response to a shut-down signal that exceeds a threshold level, and (4) a pin at a preset voltage during normal operation and whose impedance to the reference node determines frequency of operation of the switching arrangement.

The ballast also includes first through fourth protection circuits:

(1) The first protection circuit compares a first voltage representing an average voltage on the midpoint node with a second voltage representing the voltage of the DC blocking capacitor, and for sending a shut-down signal to the shut-down pin when one of the first and second voltages exceeds the other by respective predetermined amounts.

(2) A second protection circuit has an output coupled to the pre-heat pin for detecting a brief period of substantially excessive lamp voltage when a lamp has not yet started in response to current spikes through a switch of the switching arrangement and, in turn, for supplying the pre-heat pin with a re-start signal.

(3) A third protection circuit detects a longer period of less excessive lamp voltage; the third protection circuit including a DC amplifier with a response time substantially longer than the brief period for amplifying a signal representing the output of the second protection circuit and providing the resulting signal to the shut-down pin. The first and third protection circuits share an auxiliary circuit that prevents each of them from continually sending a shut-down signal to the shut-down pin.

(4) A fourth protection circuit lowers the mentioned impedance when a voltage representing the magnitude of an AC input voltage falls below the mentioned preset voltage by a predetermined amount.

A ballast may incorporate any one or any combination of the foregoing protection circuits.

DESCRIPTION OF THE DRAWINGS

In the drawings, in which like reference numerals refer to like parts:

FIGS. 5A–5C shows waveforms of envelopes of ballast current versus rectified line input voltage over time.

DETAILED DESCRIPTION OF THE INVENTION

Figure 1:
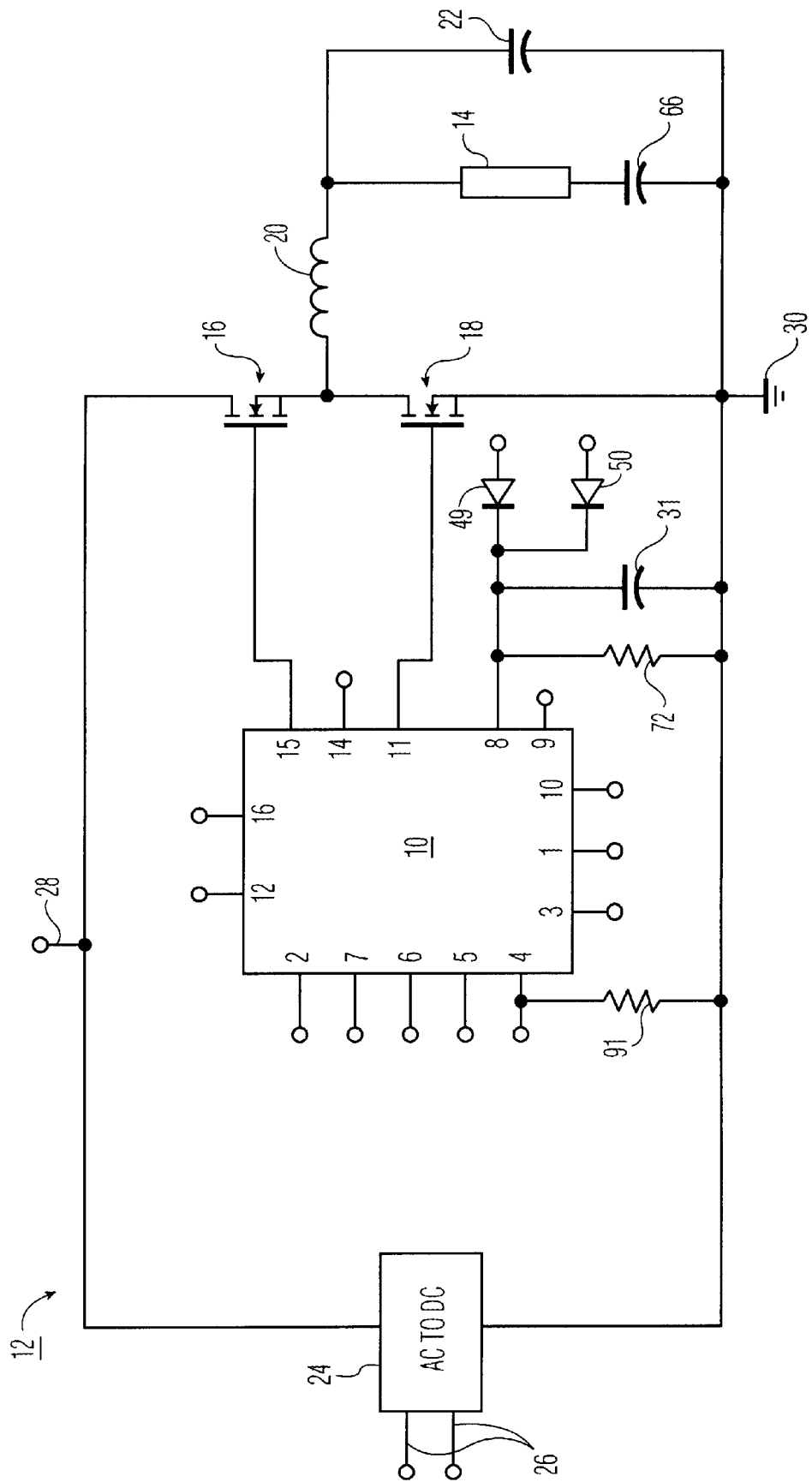
FIG. 1 is a simplified schematic diagram, partly in block, of a ballast for a fluorescent lamp including an integrated circuit for driving a half bridge switching arrangement.

FIG. 1 shows an integrated circuit (IC) 10 in a ballast circuit 12 for a fluorescent lamp 14. IC 10 may comprise chip no. L6574 manufactured by ST Micro electronics of Italy, for instance. Circuit 12 includes a switching arrangement comprising a pair of switches 16 and 18, such as MOLESTS. Ballast 12 may include a resonant inductor 20 and a resonant capacitor 22. An AC to DC converter 24 receives AC power from mains 26, and produces a DC voltage between a positive rail node 28 and a reference node 30.

FIG. 1 is simplified in various respects, so as, for instance, to represent lamp 14 as a single lamp, and to omit circuitry whose implementation will be routine to those of ordinary skill in the art. It will be routine to those of ordinary skill in the art to include various modifications, such as including plural lamps.

Protection Against Lamp Rectification

Circuitry for protecting the ballast against the lamp voltage rectifying utilizes a shut-down pin 8 of IC 10 (FIG. 1). When the voltage of pin 8 reaches a predetermined level e.g., 0.6 volts), a latch (not shown) in IC 10 shuts down the IC, and hence stops ballast operation. A capacitor 31 protects pin 8 from glitches.

Figure 2:
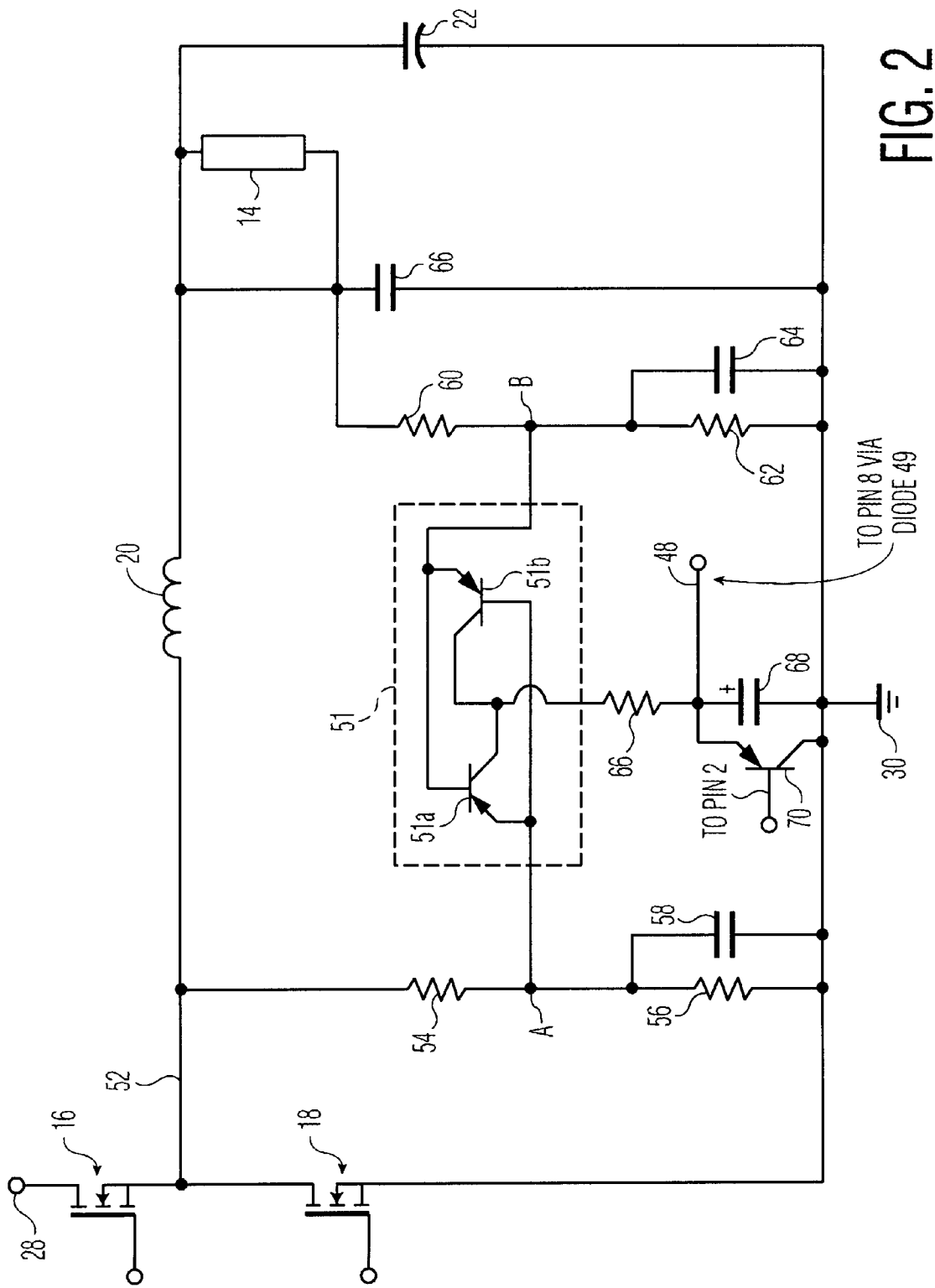
FIG. 2 is a schematic diagram of portions of the illustrated parts of the ballast of FIG. 1 together with additional circuitry for implementing protection against lamp rectification.

FIG. 2 shows a node 48, which may be connected to pin 8 of the IC via a AN diode 49 (FIG. 1), and which receives the output of a circuit 51. Circuit 51 compares the voltage at point A with the voltage at point B. The voltage on point A represents the average of the voltage on a midpoint node 52 between switches 16 and 18. The voltage on node A may be provided by a resistive voltage divider including resistances 54 and 56. A capacitor 58 smoothest the AC voltage on midpoint 52 to provide an averaged voltage. The voltage on node B may be provided by a resistive voltage divider including resistances 60 and 62. A capacitor 64 smoothest the voltage signal obtained from DC blocking capacitor 66. Capacitors 58 and 64 also desensitize circuit 51 from glitches.

Preferably, the voltage on node A is substantially proportional to half the voltage on the positive rail node 28, while the voltage on node B is substantially proportional to half the voltage on the DC blocking capacitor. If the duty cycle of the two switches 18 and 16 is other than 50 percent, this variation affects the voltages at A and B equally, so any effect of this variation is cancelled out.

Circuit 51 may include a pair of PAP transistors 51a and 51b having their bases connected to nodes B and A, respectively, and their other nodes connected as shown. When either the voltage at point A exceeds the voltage at point B, or vice versa, by respective predetermined amounts (typically the same), one of transistors 51a and 51b turns on. This causes the voltage on pin 8 to rise at a rate determined by a resistor 66 and a capacitor 68. Once the voltage on pin 8 exceeds a predetermined amount (e.g., 0.6 volts), the IC (10, FIG. 1) shuts down. Transistors 51a and 51b perform the well-known function of a comparator. This function can be provided in many other ways that will be routine to those of ordinary skill in the art.

When the IC shuts down, a PAP transistor 70 discharges capacitor 68. It does so by having its base connected to pin 2 of the IC (FIG. 1), which is normally at a preset level (e.g., 2.5 volts) during normal ballast operation. When the ballast shuts down, the voltage on pin 2 drops, turning on transistor 70 and discharging capacitor 68. Thus, whenever power to the ballast is toggled or the lamp is replaced, the voltage on capacitor 68 rapidly decays so that an elevated voltage on capacitor 68 does not prevent the lamp from restarting.

Alternatives to the pair of PAP transistors 51a and 51b can be found in circuitry textbooks under the classification of comparators. A resistor 72 (FIG. 1) is connected from pin 8 to reference node 30 to make sure the voltage on such pin is reset to zero when driving current is removed. If a lamp is replaced after the ballast has been shut down from a voltage on pin 8, resistor 72 assures that the IC automatically restarts when the IC is powered up. Resistor 72 also removes leakage current from transistors 51a and 51b, which might otherwise accidentally trigger a shut down at high temperatures.

Protection Against Excessive Lamp Voltage

In addition to pin 8 of the IC (FIG. 1), pin 9 of the IC (FIG. 1) is also used to protect against excessive lamp voltage. The occurrence of the voltage on pin 9 exceeding a threshold level triggers a control circuit in the IC (not shown) to operate switches 16 and 18 at a frequency sweep that starts at a pre-heat frequency, drops through a substantially lower resonant frequency, and reaches a still lower operating frequency.

Figure 3:
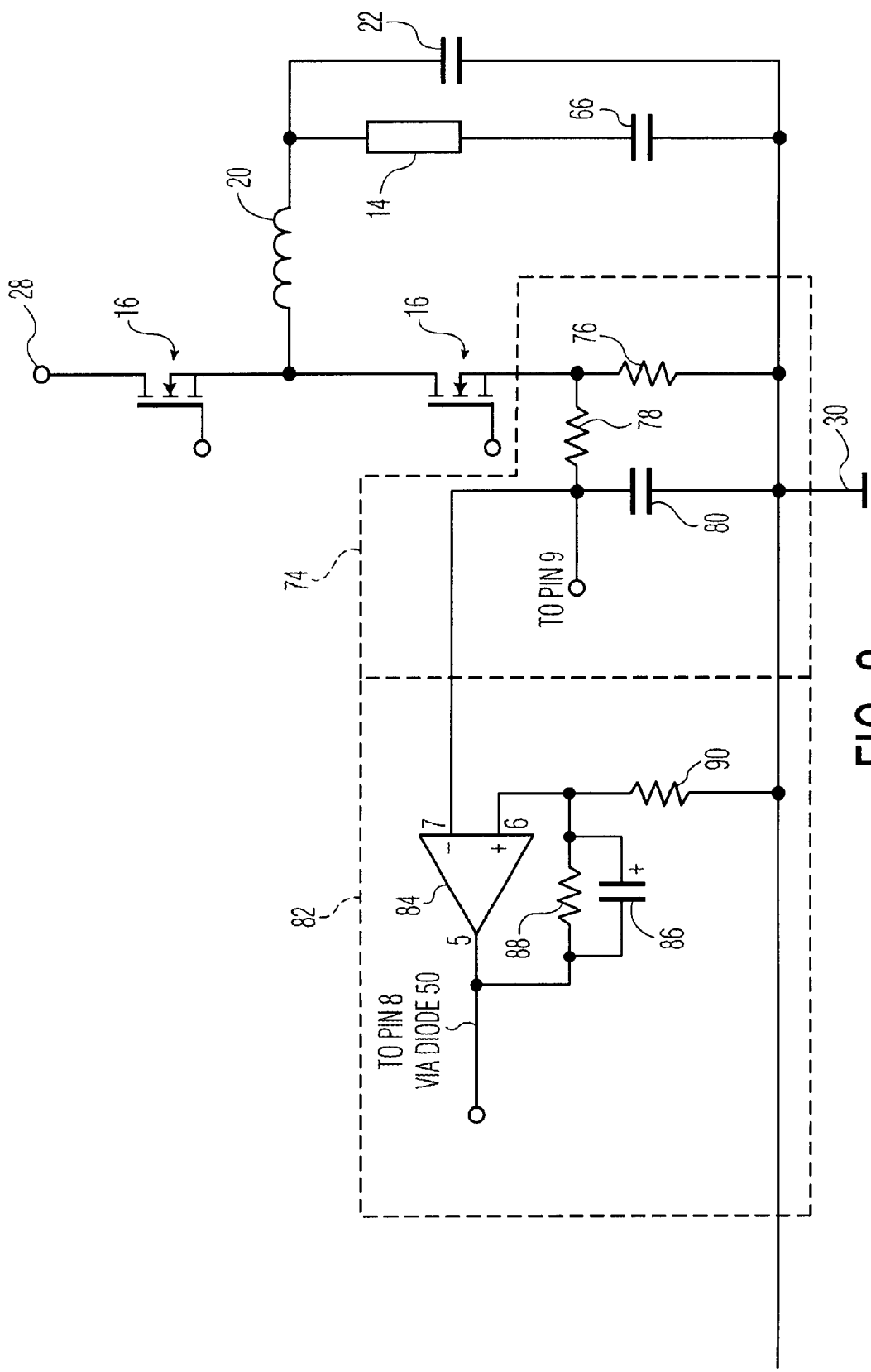
FIG. 3 is a schematic diagram of portions of the illustrated parts of ballast of FIG. 1 together with additional circuitry for implementing protection against excessive lamp voltage.

FIG. 3 shows circuitry cooperating with pins 8 and 9 to protect against excessive lamp voltage. Circuitry 74 very rapidly detects highly excessive lamp voltage (e.g., 400 percent overload) that manifests as spikes of current through a resistor 76. The voltage on resistor 76 is conveyed to pin 9 via a resistor 78 and a capacitor 80, and consists essentially of a series of positive spikes at the operating frequency of the switches. If the lamp voltage is highly excessive for a brief period of time, then even a single spike will trigger pin 9 to restart the frequency sweep just described, with the result of rapidly shutting down power to the lamp.

Circuitry 82 detects a more modest excess of lamp voltage (e.g., 15 percent overload) over a longer period of time, which may be on the order of half a minute. Circuitry 84 uses an operational amplifier (op amp) 84 internal to the IC (FIG. 1), and whose pins are numbered 5, 6 and 7 (FIGS. 1 and 3). Pin 5 is the output, while pin 7 is an inverting input and pin 6 is a non-inverting input. Connecting a capacitor 86 across pins 5 and 6 makes the op amp an integrator. Adding resistors 88 and 90 turns the integrator into a DC amplifier with a very slow response time, on the order of half a minute.

The thus-described DC amplifier receives the output of pin 9 on its inverting input 7, and provides an output to pin 8 via AN diode 50 (FIG. 1) to shut down the ballast only if a modest overvoltage persists for a predetermined, sustained period of time (e.g., half a minute). If such modest overvoltage is briefer, the ballast does not shut down. AN diode 50 is associated with AN diode 49 so as to make pin 8 receive whichever voltage is highest on the anodes of the diodes.

If circuitry 82 turns off the ballast, transistor 70 turns on and prevents capacitor 68 (FIG. 2) from getting charged during the shutdown, which it otherwise would. This enables automatic-restart of the ballast by merely replacing a lamp.

The foregoing operation of transistor 70 was previously described in connection with protection against rectification of lamp voltage (FIG. 2). The FIG. 2 and FIG. 3 circuits cooperate by both using transistor 70 for discharging capacitor 68.

Protection Against Low Line Voltage

Figure 4:
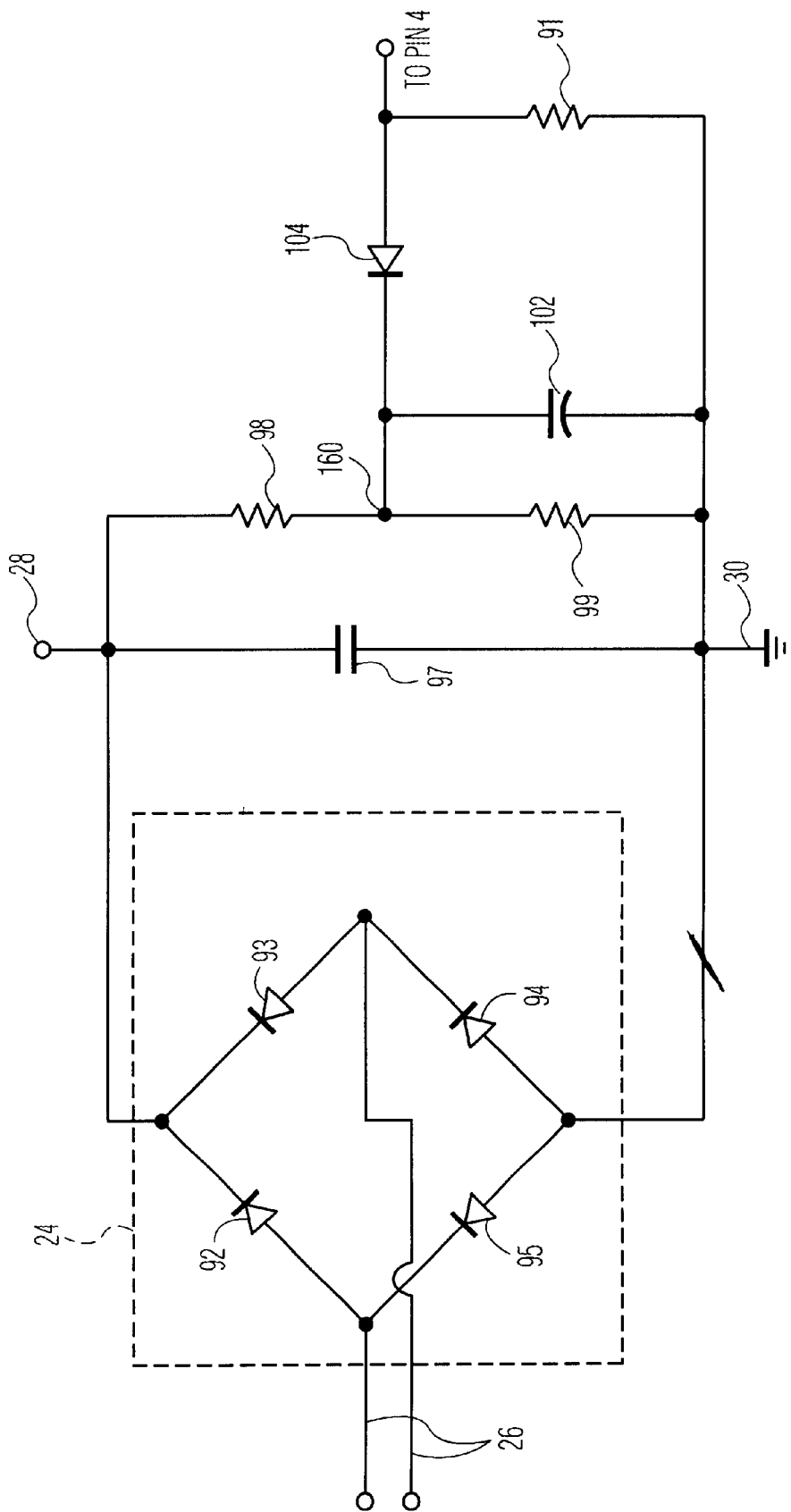
FIG. 4 is a schematic diagram of portions of the illustrated parts of the ballast of FIG. 1 together with additional circuitry for implementing protection against low line voltage.

Pin 4 of the IC (FIG. 1) cooperates with the circuitry of FIG. 4 to protect against low line voltage. Pin 4 is normally at a preset reference potential, such as 2.5 volts. The frequency of operation of switches 16 and 18 (FIG. 1) is determined by the impedance between pin 4 and reference node 30. In the absence of low line voltage, resistor 91 (FIG. 1) determines that impedance. FIG. 4 shows a circuit that increases the switching frequency to momentarily reduce the output current of the ballast to essentially zero when the line voltage becomes undesirably low. This prevents burn out of the switches.

In FIG. 4, AN diodes 92–95 implement AC to DC converter 24 (FIG. 1), in the form of a full-wave rectifier. A capacitor 97 smoothest out the rectified voltage on positive rail node 28. Because resistors 98 and 99 form a voltage divider, the voltage at their common node 160 represents the magnitude of the AC input voltage. Such voltage is smoothed by a capacitor 102. A AN diode 104 "sees" the voltage at node 160 on its anode, and sees the pin 4 voltage on its cathode. When the node 160 voltage falls below the preset voltage on pin 4 by about 0.7 volts, the diode becomes forward biased and starts conducting. This, in turn, places resistor 99 between pin 4 and reference node 30, thereby increasing the conductance from pin 4 to node 30. The result is a decrease of impedance between pin 4 and node 30, so that the switching frequency is abruptly increased. Alternatives to using a AN diode 104 include the combination of a diode and a resistor in series, or the use of a transistor to incorporate gain to accentuate the frequency shifting effect in a manner that will be apparent to those of ordinary skill in the art.

FIGS. 5A–5C shows that increasing the frequency of switching reduces ballast current. These figures compare envelopes 106 and 108 of ballast current with rectified line voltage waveforms 110 and 112. Only envelopes of ballast current are shown, since the actual current waveforms oscillate much more rapidly than the line voltage. For line voltage 110, corresponding envelope 106 falls to essentially zero due to higher switching frequency when diode 104 (FIG. 4) becomes forward biased, which may occur when voltage 110 falls below 1.8 volts, for instance. This occurs over intervals 106a, centered near the zero crossings of voltage 110. When the line voltage falls further, to that of waveform 112, corresponding envelope 108 contains larger periods 108a of essentially zero magnitude. In this way, as the line voltage falls further and further, the ballast current remains essentially zero for larger and larger portions of the line voltage cycles. Owing to this, the DC potential on the positive rail node 28 does not fall so sharply with declining line voltage, which beneficially prevents burn out of the switches.

Other Advantages

When using the circuitry described herein, the ballast will be protected against degassing of a lamp. Such degassing causes high lamp voltage, which repeatedly causes a trip on pin 9 from circuitry 74 (FIG. 3). This causes the IC to preheat and go through the mentioned frequency sweep again. All this time, a sufficient imbalance in voltage exists between nodes A and B (FIG. 2), so that capacitor 68 (FIG. 2) charges up, eventually causing a trip on pin 8 that stops the ballast. This sequence of events also happens if a lamp is removed while running or degausses while running.

Using the specific IC mentioned above, exemplary component values for a fluorescent lamp 14 rated at 26-watts, with a DC potential on rail 28 of 470 volts, and with pre-heat, resonant and operating frequencies of 87 kHz, 57 kHz, and 45 kHz, respectively, are as follows:

| Resistances | Ohms |
| --- | --- |
| 54 | 474K |
| 56 | 10k |
| 60 | 475K |
| 62 | 10k |
| 66 | 200k |
| 72 | 100k |
| 76 | .56 |
| 78 | 1k |
| 88 | 110k |
| 90 | 7.5k |
| 91 | 68.1k |
| 98 | 1.2 M |
| 99 | 33.2K |
| Capacitances | Microfarads |
| 22 | 3.3nf |
| 31 | 470 pf |
| 58 | .1 uF |
| 64 | .1 uF |
| 66 | .1 uF |
| 68 | 100 uF |
| 80 | 470 pF |
| 86 | 22 uF |
| 102 | .1 uF |
| Transistors | Description |

-continued

| | |
| --- | --- |
| 16 | A 3NB50, n-channel, enhancement mode MOSFET, sold by ST Microelectronics, an international company |
| 18 | Same as 16 |
| 51a | A PNP model 3906 transistor sold by Rohm of Kyoto Japan. |
| 51b | Same as 51a |
| 70 | Same as 51a |

While the invention has been described with respect to specific embodiments by way of illustration, many modifications and changes will occur to those skilled in the art. For instance, with a different IC than the specific one described, the pin numbering may differ. It is, therefore, to be understood that the appended claims are intended to cover all such modifications and changes as fall within the true scope and spirit of the invention.

What is claimed is:

1. A gas discharge lamp ballast with protection against significant rectification of lamp voltage, comprising:
   a) a resonant load circuit for at least one lamp, including a DC blocking capacitor connected between a reference node and the at least one lamp;
   b) a switching arrangement including first and second switches serially connected between a rail node at a DC potential and the reference node, for supplying AC current to the load via a midpoint node between the first and second switches;
   c) an integrated circuit including:
      i) a driver for the switching arrangement;
      ii) a shut-down pin associated with an internal shut-down latch for shutting down the driver in response to a shut-down signal that exceeds a threshold level; and
   d) a protection circuit for comparing a first voltage representing an average voltage on the midpoint node with a second voltage representing the voltage of the DC blocking capacitor, and for sending a shut-down signal to the shut-down pin when one of the first and second voltages exceeds the other by respective predetermined amounts.

2. The ballast of claim 1, wherein the first voltage and the second voltage respectively are substantially proportional to half the voltage on the rail node and the voltage of the DC blocking capacitor.

3. The ballast of claim 1, wherein the protection circuit sends a shut-down signal to the shut-down pin when either of the first and second voltages exceeds the other by a respective, predetermined amount.

4. The ballast of claim 1, wherein the protection circuit includes an auxiliary circuit that prevents said protection circuit from continually sending a shut-down signal to the shut-down pin.

5. The ballast of claim 4, wherein the auxiliary circuit comprises:
   a) a voltage pin in the integrated circuit providing a non-zero voltage during normal operation and which drops in amplitude when the integrated circuit shuts down;
   b) a capacitor coupled from the shut-down pin to the reference node, and which charges up to a sufficient level to send a shut-down signal to the shut-down pin when one of the first and second voltages exceeds the other by a predetermined amount; and
   c) a discharge circuit for discharging the capacitor in response to the amplitude of the voltage on the voltage pin dropping when the integrated circuit shuts down.

6. A gas discharge lamp ballast with protection against excessive lamp voltage, comprising:
   a) a resonant load circuit for at least one lamp;
   b) a switching arrangement for supplying AC current to the load;
   c) an integrated circuit including:
      i) a driver for the switching arrangement including control means to create a frequency sweep from a pre-heat frequency, through a substantially lower, resonant frequency, to a still lower operating frequency;
      ii) a pre-heat pin for triggering the control means to re-start a frequency sweep in response to a re-start signal that exceeds a threshold level; and
      iii) a shut-down pin associated with an internal shut-down latch for shutting down the driver in response to a shut-down signal that exceeds a threshold level;
   d) a first protection circuit having an output coupled to the pre-heat pin for detecting a brief period of substantially excessive lamp voltage when a lamp has not yet started in response to current spikes through a switch of the switching arrangement and, in turn, for supplying the pre-heat pin with a re-start signal; and
   e) a second protection circuit for detecting a longer period of less excessive lamp voltage; the second protection circuit including a DC amplifier with a response time substantially longer than the brief period for amplifying a signal representing the output of the first protection circuit and providing the resulting signal to the shut-down pin.

7. The ballast of claim 6, wherein the second protection circuit includes an auxiliary circuit that prevents said protection circuit from continually sending a shut-down signal to the shut-down pin.

8. The ballast of claim 7, wherein the auxiliary circuit comprises:
   a) a voltage pin in the integrated circuit providing a non-zero voltage during normal operation and which drops in amplitude when the integrated circuit shuts down;
   b) a capacitor coupled from the shut-down pin to the reference node, and which charges up to a sufficient level to send a shut-down signal to the shut-down pin when one of the first and second voltages exceeds the other by a predetermined amount; and
   c) a discharge circuit for discharging the capacitor in response to the amplitude of the voltage on the voltage pin dropping when the integrated circuit shuts down.

9. The ballast of claim 6, wherein the DC amplifier utilizes an operation amplifier contained within the integrated circuit.

10. A method of detecting excessive lamp voltage in a fluorescent lamp ballast of the type including a DC-to-AC switching arrangement, for shutting off the ballast, comprising:
   a) detecting a brief period of substantially excessive lamp voltage when a lamp has not yet started, from current spikes through a switch of the switching arrangement; and
   b) detecting a longer period of less excessive lamp voltage by amplifying, with a response time substantially longer than the brief period, a signal representing the current spikes; and
   c) shutting down the ballast when the signal exceeds a threshold level.

11. A gas discharge lamp ballast with protection against both significant rectification of lamp voltage and excessive lamp voltage, comprising:
   a) a resonant load circuit for at least one lamp, including a DC blocking capacitor connected between a reference node and the at least one lamp;
   b) a switching arrangement including first and second switches serially connected between a rail node at a DC potential and the reference node, for supplying AC current to the load via a midpoint node between the first and second switches;
   c) an integrated circuit including:
      i) a driver for the switching arrangement including control means to create a frequency sweep from a pre-heat frequency, through a substantially lower, resonant frequency, to a still lower operating frequency;
      ii) a pre-heat pin for triggering the control means to re-start a frequency sweep in response to a re-start signal that exceeds a threshold level; and
      iii) a shut-down pin associated with an internal shut-down latch for shutting down the driver in response to a shut-down signal that exceeds a threshold level;
   d) a first protection circuit for comparing a first voltage representing an average voltage on the midpoint node with a second voltage representing the voltage of the DC blocking capacitor, and for sending a shut-down signal to the shut-down pin when one of the first and second voltages exceeds the other by respective predetermined amounts;
   e) a second protection circuit having an output coupled to the pre-heat pin for detecting a brief period of substantially excessive lamp voltage when a lamp has not yet started in response to current spikes through a switch of the switching arrangement and, in turn, for supplying the pre-heat pin with a re-start signal; and
   f) a third protection circuit for detecting a longer period of less excessive lamp voltage; the third protection circuit including a DC amplifier with a response time substantially longer than the brief period for amplifying a signal representing the output of the second protection circuit and providing the resulting signal to the shut-down pin;
   g) the first and third protection circuits sharing an auxiliary circuit that prevents each of them from continually sending a shut-down signal to the shut-down pin.

12. The ballast of claim 11, wherein the auxiliary circuit comprises:
   a) a voltage pin in the integrated circuit providing a non-zero voltage during normal operation and which drops in amplitude when the integrated circuit shuts down;
   b) a capacitor coupled from the shut-down pin to the reference node, and which charges up to a sufficient level to send a shut-down signal to the shut-down pin when one of the first and second voltages exceeds the other by a predetermined amount; and
   c) a discharge circuit for discharging the capacitor in response to the amplitude of the voltage on the voltage pin dropping when the integrated circuit shuts down.

13. The ballast of claim 11, wherein the auxiliary circuit comprises:
   a) a voltage pin in the integrated circuit providing a non-zero voltage during normal operation and which drops in amplitude when the integrated circuit shuts down;
   b) a capacitor coupled from the shut-down pin to the reference node, and which charges up to a sufficient level to send a shut-down signal to the shut-down pin when one of the first and second voltages exceeds the other by a predetermined amount; and c) a discharge circuit for discharging the capacitor in response to the amplitude of the voltage on the voltage pin dropping when the integrated circuit shuts down.

14. A gas discharge lamp ballast with protection against low line voltage, comprising:
   a) a resonant load circuit for at least one lamp;
   b) a switching arrangement connected between a rail node at a DC potential and a reference node, for supplying AC current to the load;
   c) an integrated circuit including:
      i) a frequency source for controlling the switching arrangement; and
      ii) a pin at a preset voltage during normal operation and whose impedance to the reference node determines frequency of operation of the switching arrangement; and
   d) a protection circuit for lowering the mentioned impedance when a voltage representing the magnitude of an AC input voltage falls below said preset voltage by a predetermined amount.

15. The ballast of claim 14, wherein the protection circuit compares a first voltage representing the magnitude of an AC input voltage with a second voltage representing a reference potential, and increases the output frequency during the time that the magnitude of the smoothed input line voltage goes below a predetermined level, so as to reduce the output current of the ballast to essentially zero during this time.

16. The ballast of claim 15, wherein the protection circuit compares the first voltage with the second voltage by including a PN junction:
   a) that is located between respective nodes on which these voltages exist; and
   b) that becomes forward biased to indicate that the first voltage has fallen below the predetermined level.

17. The ballast of claim 14, wherein:
   a) the protection circuit includes a resistive voltage divider for producing the signal representing the magnitude of an AC input voltage; and
   b) conductance from said pin through the voltage divider serves to lower overall impedance from the pin to the reference node.

18. A method of detecting low line voltage supplied to a fluorescent lamp ballast of the type including an integrated circuit for driving a DC-to-AC switching arrangement at a frequency determined by an impedance from a pin of the integrated circuit to a reference node, for shutting off the ballast, the method comprising:
   a) detecting when the magnitude of an AC input voltage falls below a predetermined level; and
   b) in response, changing the mentioned impedance so as to reduce lamp current to essentially zero while the magnitude of the AC input voltage is below the predetermined level.

19. A gas discharge lamp ballast with protection against all three of significant rectification of lamp voltage, excessive lamp voltage and low line voltage, comprising:
   a) a resonant load circuit for at least one lamp, including a DC blocking capacitor connected between a reference node and the at least one lamp;
   b) a switching arrangement including first and second switches serially connected between a rail node at a DC potential and the reference node, for supplying AC current to the load via a midpoint node between the first and second switches;
   c) an integrated circuit including:

i) a driver for the switching arrangement including control means to create a frequency sweep from a pre-heat frequency, through a substantially lower, resonant frequency, to a still lower operating frequency;
   ii) a pre-heat pin for triggering the control means to re-start a frequency sweep in response to a re-start signal that exceeds a threshold level;
   iii) a shut-down pin associated with an internal shut-down latch for shutting down the driver in response to a shut-down signal that exceeds a threshold level; and
   iv) a pin at a preset voltage during normal operation and whose impedance to the reference node determines frequency of operation of the switching arrangement;
   d) a first protection circuit for comparing a first voltage representing an average voltage on the midpoint node with a second voltage representing the voltage of the DC blocking capacitor, and for sending a shut-down signal to the shut-down pin when one of the first and second voltages exceeds the other by respective predetermined amounts;
   e) a second protection circuit having an output coupled to the pre-heat pin for detecting a brief period of substantially excessive lamp voltage when a lamp has not yet started in response to current spikes through a switch of the switching arrangement and, in turn, for supplying the pre-heat pin with a re-start signal;
   f) a third protection circuit for detecting a longer period of less excessive lamp voltage; the third protection circuit including a DC amplifier with a response time substantially longer than the brief period for amplifying a signal representing the output of the second protection circuit and providing the resulting signal to the shut-down pin;
   g) the first and third protection circuits sharing an auxiliary circuit that prevents each of them from continually sending a shut-down signal to the shut-down pin; and
   h) a fourth protection circuit for lowering the mentioned impedance when a voltage representing the magnitude of an AC input voltage falls below the mentioned preset voltage by a predetermined amount.

20. The ballast of claim 19, wherein the fourth protection circuit compares a first voltage representing the magnitude of an AC input voltage with a second voltage representing a reference potential, and increases the output frequency during the time that the magnitude of the input line voltage goes below a predetermined level, so as to reduce the output current of the ballast to essentially zero during this time.

21. The ballast of claim 20, wherein the fourth protection circuit compares the first voltage with the second voltage by including a PN junction:
   a) that is located between respective nodes on which these voltages exist; and
   b) that becomes forward biased to indicate that the first voltage has fallen below the predetermined level.

22. The ballast of claim 19, wherein:
   a) the protection circuit includes a resistive voltage divider for producing the signal representing the magnitude of an AC input voltage; and
   b) conductance from the mentioned pin through the voltage divider serves to lower overall impedance from the pin to the reference node.

* * * * *